United States Patent [19]

Harden

[11] 4,193,378
[45] * Mar. 18, 1980

[54] FEEDER FOR HAY BALES AND STACKS

[76] Inventor: Richard L. Harden, R.R. 1, Lineville, Iowa 50147

[*] Notice: The portion of the term of this patent subsequent to May 16, 1995, has been disclaimed.

[21] Appl. No.: 845,872

[22] Filed: Oct. 27, 1977

Related U.S. Application Data

[63] Continuation of Ser. No. 709,862, Jul. 29, 1976, Pat. No. 4,089,301.

[51] Int. Cl.² .............................................. A01K 5/00
[52] U.S. Cl. ..................................................... 119/60
[58] Field of Search .................. 119/60, 58, 51, 20; 256/24–26; 16/147

[56] References Cited

U.S. PATENT DOCUMENTS

| 1,141,828 | 6/1915 | Rhody | 16/147 |
| 3,767,167 | 10/1973 | Rasmussen | 256/26 |
| 3,834,353 | 9/1974 | Groezinger | 119/60 |
| 3,906,903 | 9/1975 | Vandewater | 119/60 |

FOREIGN PATENT DOCUMENTS

| 615042 | 10/1926 | France | 256/25 |
| 1224212 | 8/1960 | France | 256/25 |

Primary Examiner—Jay N. Eskovitz
Attorney, Agent, or Firm—Zarley, McKee, Thomte, Voorhees & Sease

[57] ABSTRACT

A hay enclosure includes two end sections and two sections along each side. Diagonally opposite side sections are equal in length, although the two sections on each side have different lengths. The enclosure is pivotally movable to a second position wherein two triangular-in-shape enclosures are formed having an area smaller than the rectangular enclosure area. A circular enclosure includes four arcuate sections which may be collapsed about a bale of hay into two pillow-shaped enclosures. Adjacent sections are pivotally interconnected by vertically spaced apart hinges, with the upper hinge including a downwardly extending pin received in a sleeve, and the lower hinge including a pair of abutting vertically aligned sleeves in which a movable pin is received.

6 Claims, 8 Drawing Figures

U.S. Patent   Mar. 18, 1980   4,193,378
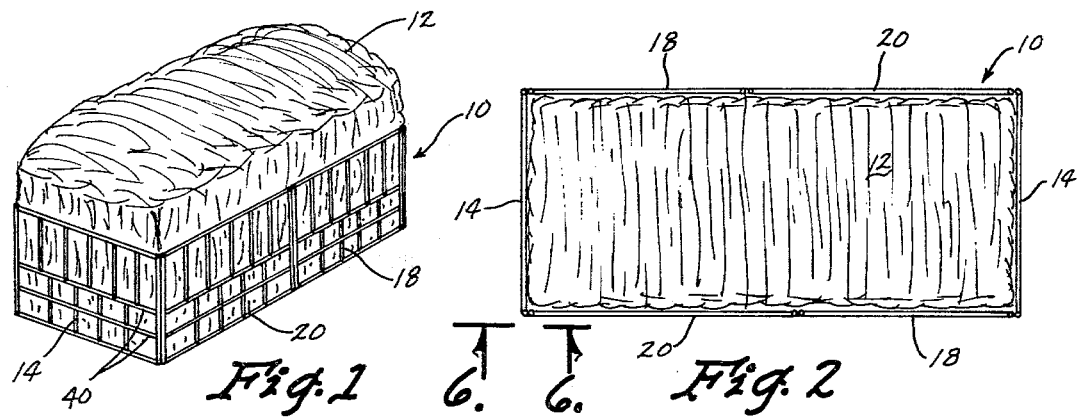
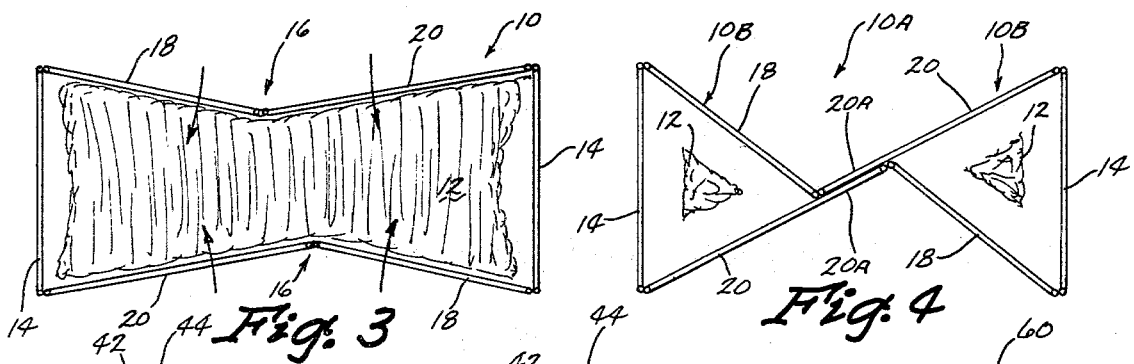
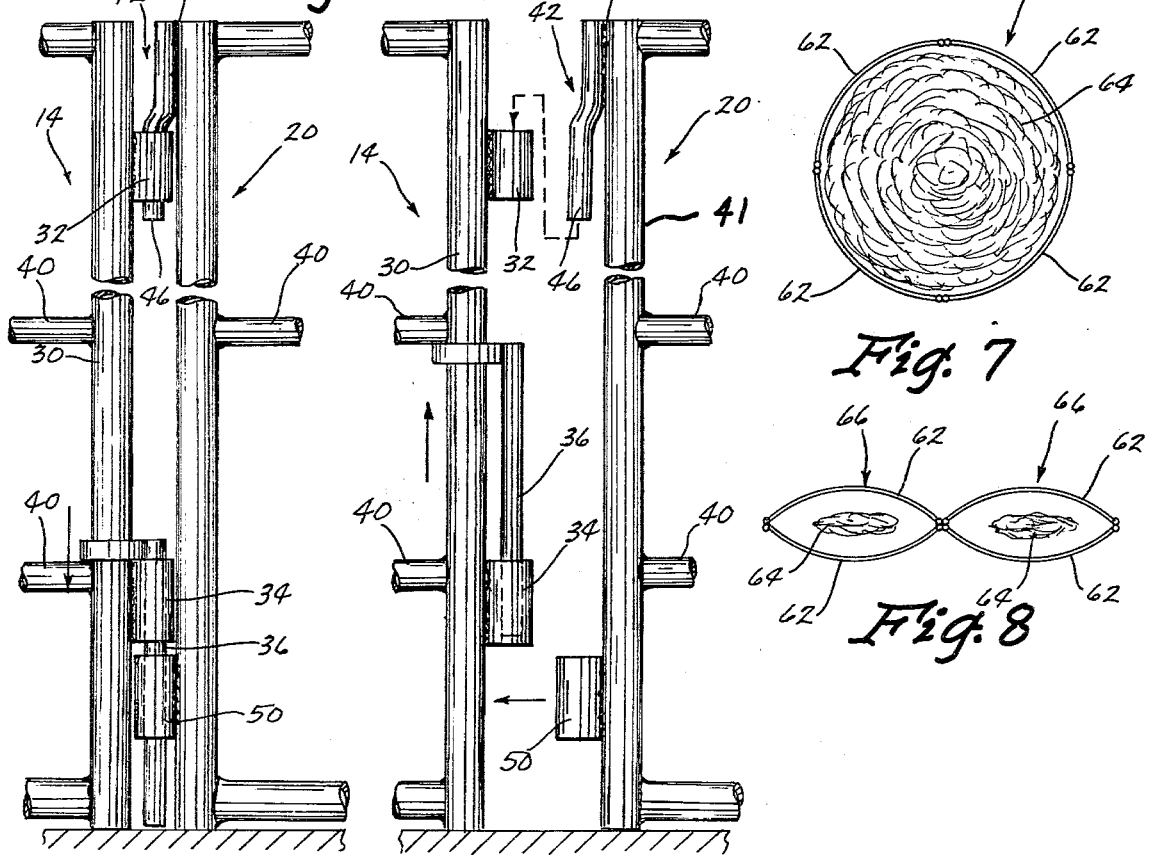

FEEDER FOR HAY BALES AND STACKS

This application is a continuation application of application Ser. No. 709,862, filed July 29, 1976, U.S. Pat. No. 4,089,301, May 16, 1978.

BACKGROUND OF THE INVENTION

A haystack and bale feeder enclosure is desired that will accommodate a full-size stack initially but will adjust in its shape as the stack is consumed by animals feeding through the side walls of the enclosure. The adjustment in the shape of the enclosure must give the animals continuous access to the remaining stack, all the while maintaining standing stability. A hinge connection between pivotally interconnected sections is necessary that will not become accidentally disengaged through rough handling by cattle feeding at the feeder enclosure.

SUMMARY OF THE INVENTION

The hay feeder enclosure of this invention includes two embodiments. The first embodiment includes six pivotally interconnected sections movable between a rectangular shape in a first position, to a second position forming two triangles. The total area of the two triangles in the second position is less than the area in the rectangular first position due to the fact that diagonally opposite sections overlap in the second position because the two sides of the enclosure in the first rectangular position include sections which are of unequal length. The short sections are diagonally opposite each other as are the long sections and when the sections are moved to the second position, forming the two triangles, the long sections are in closely adjacent parallel planes, while the short sections are in spaced-apart parallel planes.

The second embodiment of the hay feeding enclosure includes four arcuate sections pivotally interconnected to form a circular enclosure in a first position and pivotally movable to a second position forming two pillow-shaped enclosures. Due to the fact that the sections are arcuate, the midsections of opposite sides of the pillow-shaped enclosures are spaced apart, thereby providing standing stability to the structure which would otherwise be easily pushed over by animals feeding through the enclosure openings.

The adjacent sections are pivotally interconnected by two hinges. An upper hinge includes a rigid downwardly extending pin on one section received in a sleeve on the other section. The lower hinge includes a sleeve on one section vertically aligned with a sleeve on the other section, and a vertically movable pin extends through the aligned sleeves. A stop on the other section limits upward travel of the pin to maintain it in the sleeve on the other section.

In assembling the adjacent sections, the lower end of the one section is swung laterally out of alignment with the other section to allow the one section to move upwardly for the rigid pin to register with the sleeve on the other section. One section is then moved downwardly until clearance is provided between the lower sleeves such that the one section can move laterally into alignment with the other section, whereupon the moveable pin is moved into its locking position.

DESCRIPTION OF THE DRAWINGS

FIG. 1 is a perspective view of a rectangular hay feeding enclosure embracing a stack of hay.

FIG. 2 is a top plan view thereof.

FIG. 3 is a view similar to FIG. 2 illustrating the sides being collapsed towards each other as the hay is consumed.

FIG. 4 is a view similar to FIGS. 2 and 3 but showing the rectangular enclosure having been collapsed to a pair of triangular enclosures.

FIG. 5 is a view of adjacent end sections prior to being interconnected.

FIG. 6 is a view similar to FIG. 5 taken along line 6—6 in FIG. 2, illustrating the end sections being interconnected.

FIG. 7 is a top plan view of an alternate embodiment of this invention.

FIG. 8 is a top plan view similar to FIG. 7 showing the enclosure in its collapsed condition forming two pillow-shaped enclosures.

DESCRIPTION OF THE PREFERRED EMBODIMENT

The hay feeder enclosure of FIG. 1 is referred to generally by the reference numeral 10 and encloses a loaf-type haystack 12.

Enclosure 10 is rectangular in shape and includes a pair of oppositely disposed end sections 14 and opposite sides 16 comprising a pair of unequal-in-length sections 18 and 20. The short sections 18 are diagonally opposite each other as are the longer sections 20 in the two sides 16.

In FIG. 4 the rectangular enclosure 10 has been contracted into an enclosure 10A, including a pair of triangular enclosures 10B, having a total area less than the rectangular enclosure 10 due to the fact that the longer side sections 20 overlap each other along portions 20A. The section lengths may vary as long as the two side sections are of unequal length when forming the rectangular-shaped enclosure 10. As previously indicated, the longer sections 20 should be diagonally opposite as are the shorter sections 18 so that the longer sections will have overlapping end portions 20A when in the second position forming enclosure 10A. A typical size for the sections would be 9 feet for the end sections 14, 8 feet for the longer sections 20 and 7 feet for the shorter sections 18. This size enclosure will accommodate one large loaf-type haystack 12, two small stacks, or two 3,000 pound bales. Variations in the size of the various sections will allow the enclosure to suitably handle additional bales. For example, three 1,500 pound bales can be accommodated by moving the short 7-foot side section 18 to the end of the enclosure and moving the 9-foot end section 14 to the side of the enclosure.

The adjacent end sections are interconnected in a similar fashion as sections 14 and 20, illustrated in FIGS. 5 and 6. Section 14 includes a vertical end post 30 having an upper sleeve 32 and a lower guide sleeve 34. The guide sleeve 34 receives a vertically movable pin 36 carried on a collar 38 movable upwardly until it engages a side rail tube 40 which functions as a stop and is connected to the post 30. Section 20 includes a circular-in-cross-section post 41 having a vertically disposed and downwardly extending pin 42 welded at 44 to the post 41. The post 41 includes a lower offset portion 46 adapted to be received in the sleeve 32 on the post 30 of the adjacent interconnected section 14. Post 41 also includes a lower sleeve 50 positioned for registering alignment with sleeve 34 and pin 36. Sections 14 and 20 are interconnected by section 20 being raised relative to section 14 and pin portion 46 being dropped into sleeve 32. To raise section 20, the lower ends of the sections must be laterally displaced so that relative vertical movement may occur between sleeves 34 and 50 to allow pin portion 46 to enter sleeve 32. Next, the sections are allowed to move back into vertical alignment as section 20 is lowered relative to section 14, as seen in FIG. 6. Pin 36 is dropped through sleeve 50, completing the pivotal locking engagement between sections 14 and 20. Disengagement of the sections is accomplished by lifting the pin 36 to the position of FIG. 5 and then laterally disaligning the lower ends of the sections, followed by lifting section 20 upwardly, thereby removing pin portion 46 from sleeve 32.

An alternate hay feeder enclosure is illustrated in FIGS. 7 and 8 for hay bales and is referred to generally by the reference numeral 60, and is seen to include four arcuate sections 62 pivotally interconnected, as illustrated in FIGS. 5 and 6. A circular hay bale is provided in the circular enclosure 60. As the bale is consumed by animals feeding through the openings in sections 62, the cattle will push the sections toward each other until finally the enclosure assumes the position shown in FIG. 8, forming two pillow-shaped enclosures 66. The midsections of the sections 62 are spaced apart as seen in FIG. 8 due to the arcuate shape, thereby giving the pair of enclosures 66 standing stability and providing resistance to being knocked over by the feeding cattle. Further, the opposite ends of the pillow-shaped enclosures abut each other to rigidify the interconnected enclosures 66. It is appreciated that a four-section square or rectangular enclosure would totally collapse and fall down upon the section walls being moved toward each other to a position corresponding to that illustrated in FIG. 8 for the arcuate section 60.

Thus, in operation, both of the enclosures 10 and 60 may be filled with appropriate size stack of hay 12 or bale 64, and as animals feed through the openings in the enclosure side walls, the sections will be pushed towards each other until finally the enclosures are collapsed to the positions of FIGS. 4 and 8 where, as seen in FIG. 4, two triangular-shaped enclosures 10B are formed; and in FIG. 8, two pillow-shaped enclosures 66 result. In either of the enclosures in FIGS. 4 or 8, the cattle can reach the hay in the very center of the enclosures while the enclosures retain their standing stability due to the fact that the opposite side sections of the enclosures are in spaced-apart relationship.

I claim:

1. An animal adjustable hay feeder comprising an endless enclosure including six pivotally interconnected sections movable in response to feeding animals between a rectangular shape to a pair of triangular shapes,
   said enclosure having opposite end sections and oppositely disposed sides with each side having a pair of sections,
   each pair of side sections include a long and a short section, with the difference in length between said long and short sections being substantially greater than the thickness of said end sections,
   said long sections in said opposite sides being diagonally disposed and said short sections in said opposite sides being diagonally disposed whereby upon said sides being moved towards each other said long sections move into overlapping closely adjacent parallel planes and said short sections move into spaced apart parallel planes thereby forming a pair of spaced apart triangular shaped feeding enclosures.

2. The structure of claim 1 wherein each section in each triangular-shaped enclosure is of a different length.

3. An animal adjustable hay feeder comprising an endless enclosure including six pivotally interconnected sections movable in response to feeding animals between a rectangular shape to a pair of triangular shapes,
   said enclosure having opposite end sections and oppositely disposed sides with each side having a pair of sections,
   each pair of side sections include a long and a short section, with the difference in length between said long and short sections being substantially greater than the thickness of said end sections, and adjacent pivotally interconnected sections including a pin and a sleeve on one section in registering alignment and engagement with a sleeve and a pin respectively on the other section,
   said long sections in said opposite sides being diagonally disposed and said short sections in said opposite sides being diagonally disposed whereby upon said sides being moved towards each other said long sections move into overlapping closely adjacent parallel planes and said short sections move into spaced apart parallel planes thereby forming a pair of spaced apart triangular shaped feeding enclosures.

4. The structure of claim 3 wherein one of said pins is vertically movable on one of said sections.

5. The structure of claim 4 wherein said movable pin is connected to a collar vertically movable on and embracing a tube in said one section.

6. The structure of claim 5 wherein said vertically movable pin is further defined as being vertically movable in a guide sleeve integrally connected to said one section.

* * * * *